US012777290B2

(12) United States Patent
Micheyl et al.

(10) Patent No.: US 12,777,290 B2
(45) Date of Patent: Oct. 27, 2026

(54) SETTING INDIVIDUALIZED ACOUSTIC COUPLING PARAMETERS OF AN AUDIO DEVICE

(71) Applicant: Starkey Laboratories, Inc., Eden Prairie, MN (US)

(72) Inventors: Christophe D. Micheyl, Saint Genis Laval (FR); Margaret Introwitz-Williams, Minneapolis, MN (US); Henning Schepker, Oldenburg (DE)

(73) Assignee: Starkey Laboratories, Inc., Eden Prairie, MN (US)

( * ) Notice: Subject to any disclaimer, the term of this patent is extended or adjusted under 35 U.S.C. 154(b) by 240 days.

(21) Appl. No.: 18/419,750

(22) Filed: Jan. 23, 2024

(65) Prior Publication Data

US 2024/0251207 A1 Jul. 25, 2024

Related U.S. Application Data

(60) Provisional application No. 63/481,051, filed on Jan. 23, 2023.

(51) Int. Cl.
*H04R 25/00* (2006.01)
*H04R 1/10* (2026.01)

(52) U.S. Cl.
CPC ........... *H04R 25/30* (2013.01); *H04R 1/1016* (2013.01); *H04R 25/502* (2013.01); *H04R 25/70* (2013.01);
(Continued)

(58) Field of Classification Search
CPC .... H04R 25/30; H04R 1/1016; H04R 25/502; H04R 25/70; H04R 2225/023; H04R 2225/39; H04R 2225/41; H04R 2225/55
See application file for complete search history.

(56) References Cited

U.S. PATENT DOCUMENTS 7,756,283 B2 7/2010 Bramslow
8,532,320 B2 9/2013 Nordahn et al.
(Continued)

FOREIGN PATENT DOCUMENTS

EP 1594344 11/2005
EP 3038384 6/2016
(Continued)

OTHER PUBLICATIONS

Caporali, Sueli, et al., "The vent effect in instant ear tips and its impact on the fitting of modern hearing aids", Proceedings of the International Symposium on Auditory and Audiological Research, vol. 7: Auditory Learning in Biological and Artificial Systems, (2019), 205-212.
(Continued)

*Primary Examiner* — Paul Kim
*Assistant Examiner* — Annabelle Kang
(74) *Attorney, Agent, or Firm* — Schwegman Lundberg & Woessner, P.A.

(57) ABSTRACT

Disclosed herein, among other things, are systems and methods for setting acoustic coupling parameters for hearing devices. A method includes producing a receiver signal through a receiver of a hearing device, or a physical extension of the receiver, placed inside an ear canal of a user. A microphone signal is sensed, in response to the receiver signal. Based on the receiver signal and the microphone signal, an estimate of an acoustic coupling characteristic of the hearing device is computed. The estimate of the acoustic coupling characteristic may be compared to stored reference data from a memory or to a second estimate of the acoustic coupling characteristic computed for a second hearing device in a second ear of the user to obtain an improved estimate of the acoustic coupling characteristic. The improved estimate of the acoustic coupling characteristic is
(Continued)

used to modify an operational characteristic of the hearing device.

20 Claims, 5 Drawing Sheets

(52) U.S. Cl.
CPC .... *H04R 2225/023* (2013.01); *H04R 2225/39* (2013.01); *H04R 2225/41* (2013.01); *H04R 2225/55* (2013.01)

(56) References Cited

U.S. PATENT DOCUMENTS

| | | | |
|---|---|---|---|
| 8,542,841 | B2 | 9/2013 | Lopresti et al. |
| 8,571,224 | B2 | 10/2013 | Recker et al. |
| 9,107,015 | B2 | 8/2015 | Zhang et al. |
| 9,271,666 | B2 | 3/2016 | Stirnemann |
| 11,917,372 | B2 | 2/2024 | Schepker et al. |
| 12,177,632 | B2 | 12/2024 | Schepker et al. |
| 2007/0036377 | A1* | 2/2007 | Stirnemann .......... H04R 25/505 381/315 |
| 2010/0246869 | A1 | 9/2010 | Zhang et al. |
| 2011/0150231 | A1 | 6/2011 | Natarajan |
| 2015/0063614 | A1 | 3/2015 | Petersen et al. |
| 2019/0046089 | A1 | 2/2019 | Pislak et al. |
| 2019/0082278 | A1 | 3/2019 | Boley et al. |
| 2022/0167101 | A1 | 5/2022 | Jin et al. |
| 2022/0383848 | A1* | 12/2022 | Darlington ........... H04R 1/1083 |
| 2023/0009826 | A1* | 1/2023 | Jin .......................... H04R 25/70 |
| 2023/0020280 | A1 | 1/2023 | Schepker et al. |
| 2023/0044509 | A1 | 2/2023 | Guo et al. |
| 2024/0163618 | A1 | 5/2024 | Schepker et al. |

FOREIGN PATENT DOCUMENTS

| | | |
|---|---|---|
| EP | 2846559 | 11/2018 |
| EP | 4132009 | 2/2023 |

OTHER PUBLICATIONS

Iverson, Sarah, et al., "Starkey's In-situ Audiometer: Greater flexibility, improved accuracy", Starkey Laboratories, Inc., (2022), 7 pgs.

"U.S. Appl. No. 18/419,744, Notice of Allowance mailed Aug. 16, 2024", 9 pgs.

"U.S. Appl. No. 17/811,460, Notice of Allowance mailed Oct. 19, 2023", 9 pgs.

"European Application Serial No. 24153482.5, Extended European Search Report mailed Jun. 3, 2024", 10 pgs.

* cited by examiner

SETTING INDIVIDUALIZED ACOUSTIC COUPLING PARAMETERS OF AN AUDIO DEVICE

CROSS-REFERENCE TO RELATED APPLICATION

This patent application claims the benefit of U.S. Provisional Patent Application No. 63/481,051, filed Jan. 23, 2023, which is incorporated by reference herein in its entirety.

TECHNICAL FIELD

This document relates generally to audio device systems and more particularly to setting individualized acoustic coupling parameters for audio device applications.

BACKGROUND

Examples of audio devices include hearing devices, also referred to herein as hearing assistance devices or hearing instruments, include both prescriptive devices and non-prescriptive devices. Specific examples of hearing devices include, but are not limited to, hearing aids, headphones, assisted listening devices, and earbuds.

Hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

Hearing device fitting and parameter adjustment may be dependent upon individual needs of particular users. Improved methods of setting acoustic coupling parameters for audio devices are needed.

SUMMARY

Disclosed herein, among other things, are systems and methods for setting acoustic coupling parameters for hearing device applications. A method includes producing a receiver signal through a receiver of a hearing device, or a physical extension of the receiver, placed inside an ear canal of a user. A microphone signal is sensed, in response to the receiver signal, using a microphone placed outside the ear canal. Based on the receiver signal and the microphone signal, an estimate of an acoustic coupling characteristic of the hearing device is computed. The estimate of the acoustic coupling characteristic may be compared to stored reference data from a memory to obtain an improved estimate of the acoustic coupling characteristic. The estimate of the acoustic coupling characteristic may be compared to a second estimate of the acoustic coupling characteristic computed for a second hearing device placed inside a second ear canal of the user to obtain the improved estimate of the acoustic coupling characteristic. The improved estimate of the acoustic coupling characteristic is used to modify an operational characteristic of the hearing device, or to make a recommendation for a modification of a physical characteristic or operational characteristic of the hearing device.

Various aspects of the present subject matter include a system including a hearing device including a microphone and a receiver. The hearing device is configured to produce a receiver signal through the receiver of the hearing device, or a physical extension of the receiver, placed inside an ear canal of a user. The system further includes one or more processors programmed to receive a microphone signal, in response to the receiver signal, from the microphone placed outside the ear canal. The one or more processors are further programmed to compute an estimate of an acoustic coupling characteristic of the hearing device based on the receiver signal and the microphone signal. The one or more processors may be further programmed to compare the estimate of the acoustic coupling characteristic to stored reference data from a memory to obtain an improved estimate of the acoustic coupling characteristic. The one or more processors may be further programmed to compare the estimate of the acoustic coupling characteristic to a second estimate of the acoustic coupling characteristic computed for a second hearing device placed inside a second ear canal of the user to obtain the improved estimate of the acoustic coupling characteristic. The one or more processors are further programmed to use the improved estimate of the acoustic coupling characteristic to modify an operational characteristic of the hearing device, or to make a recommendation for a modification of a physical characteristic or operational characteristic of the hearing device.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
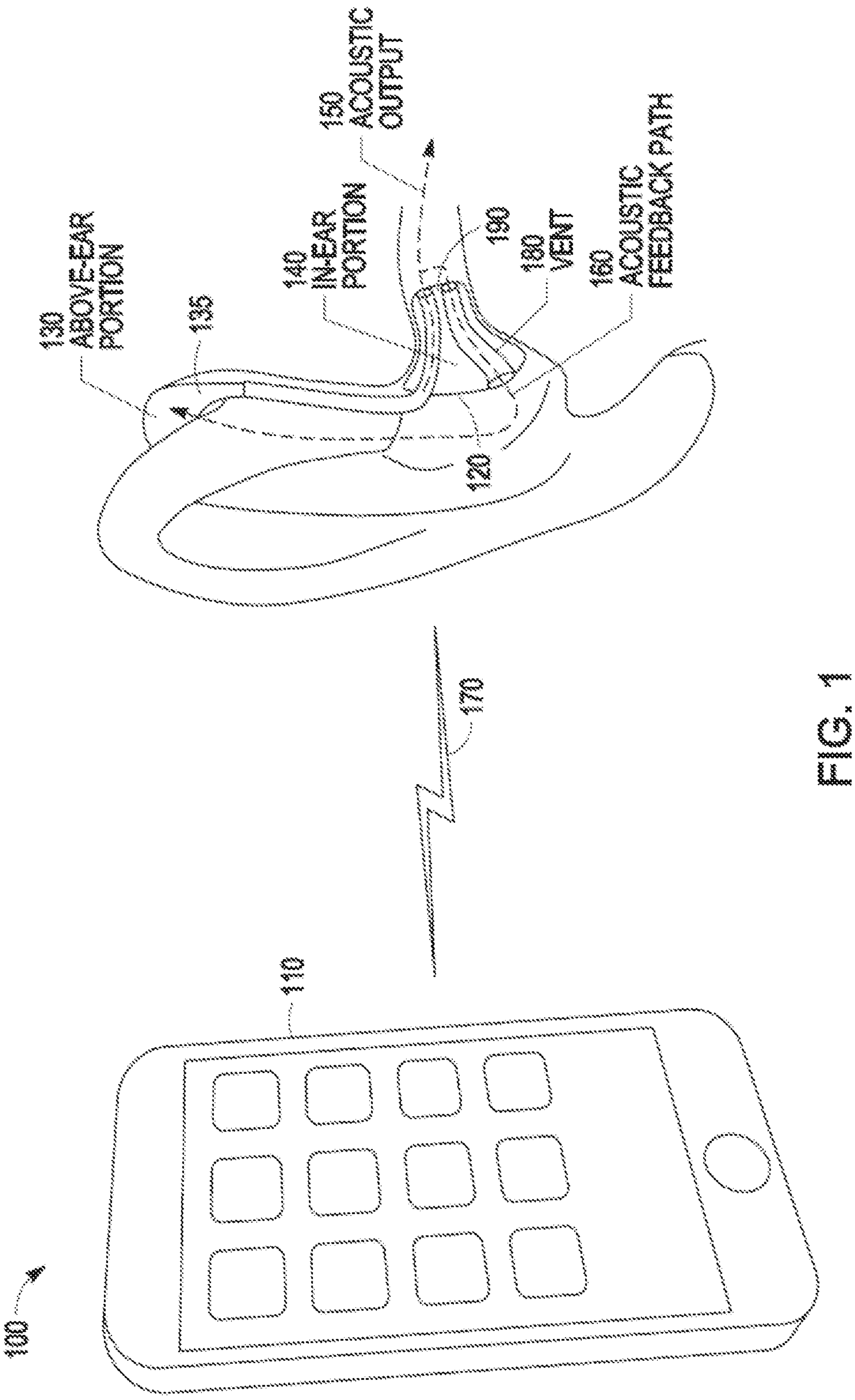
FIG. 1 illustrates a block diagram of a system for setting acoustic coupling parameters for hearing devices, according to various examples of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss audio devices such as hearing devices generally, including earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

The present subject matter may be used in situations in which a hearing aid or other in-the-ear device is placed in a user's ear, and some of its parameters (e.g., amplification gains) may be adjusted automatically, taking into account the individual acoustic characteristics of the user's ear, such as characteristics of the residual ear canal with the hearing aid or audio device in place inside the ear. In one example, the present subject matter may be used during hearing aid fitting, e.g., for automatic adjustment of hearing aid parameters such as amplification gains, in-situ audiometry stimulus levels, tinnitus masker band levels, etc.

Specifically, the present subject matter may be used to aid in setting parameters of a hearing aid device or hearing aid fitting software, based on acoustic measures performed in a user's ear or ears. The present subject matter provides algorithms for (a) programmatically combining estimates of one or more characteristics of the acoustic coupling of one or two hearing aid devices with one or both ears of a user, with data collected in a sample of individuals, and (b) using the results of the combination to select, recommend or automatically change settings of a hearing aid device or hearing aid fitting software. Using the present subject matter, the settings selected using the algorithms may be optimized with respect to a pre-defined bias-variance tradeoff objective. The present subject matter can also be used in audio devices, or in software used to set operational characteristics of audio devices, or other hearing aids, such as personal sound amplification devices.

To properly set parameters of an audio device, so that the device produces the desired acoustic sound field in the ear of a user, it is advantageous to first collect and analyze acoustic measures inside the ear of the same user, with the audio device positioned inside the ear as it is during normal use. These measurements can be performed, for example, by playing a sound through the device and measuring the sound that is fed back to the microphone, such as through a process called feedback canceller (FBC) initialization. The present subject matter automates the collection and processing of in-the-ear acoustic measurements, and further automates the individualization (personalization) of settings of audio devices.

The present subject matter relates to methods or algorithms for combining measured or calculated characteristics of acoustic coupling between one or two audio devices (e.g., hearing aids) and a user's one or two ears, and/or with reference data (stored in a database). The methods can be used for setting parameters of an audio device, or a pair of audio devices, or of software used to set parameters of an audio device or pair, so as to optimize the audio device performance with respect to a pre-defined bias-variance criterion on an error between measured and predicted real-ear sound responses of the audio device. In various examples, the present subject matter processes acoustic measures obtained in-the-ear of a user (e.g., in the context of feedback-canceller initialization performed during fitting of a hearing aid) to estimate characteristics of acoustic coupling between an audio device and an ear, such as vent effects, or leakage of sound from outside of the ear canal through a vent or slit-leaks on the device.

In some examples, the present subject matter uses processing methods to estimate the statistical reliability of measured acoustic in-the-ear signals and uses the estimate to ameliorate the computational estimation of acoustic coupling characteristics of an individual ear, and then compares and/or combines the estimates across the two (left and right) ears of the user. Combining acoustic coupling measures across the two ears of a user may be advantageous because these measures tend to be correlated as audio devices are usually fitted symmetrically, and the dimensions and acoustic properties of left and right human ear canals tend to covary under the influence of common factors, such as head size. Thus, the statistical reliability or robustness of individual estimates of acoustic coupling characteristics can be enhanced by combining the estimates (or the measurements on which they are based) across the two ears of a user.

In some examples, the present subject matter combines (e.g., compares) estimates of acoustic coupling characteristics based on individual measures with reference data such as data stored in a database. Estimates of acoustic coupling characteristics based on individual measures are limited based on relatively short measurement times to avoid bothering the individual user. Moreover, these measures can be impacted by suboptimal test conditions such as ambient noise, reverberation, a damaged or plugged microphone or receiver, etc. Therefore, these individual in-the-ear measures can be unreliable in some cases, and unreliable measurement can impact the estimated acoustic coupling characteristics and the subsequent audio device adjustments. In some examples, the present subject matter limits this risk by comparing and/or mathematically combining individual estimates with reference data. The reference data may be based on measurements across many ears and many individuals in a representative sub-group of the targeted user population, and can provide measures of variability and of central tendencies, which can then be used to enhance the individual estimates.

The present subject matter provides an algorithm for combining estimates of certain characteristics of the acoustic coupling between an ear-worn audio device and an ear of a user (for example, an estimated outward transfer function of a vent on a hearing aid) based on acoustic measures obtained in the same user's ear, using the same audio device, with (a) data obtained in, or related to, the other ear of the same user, and/or (b) data obtained in other users, and stored in a database.

In one example, an acoustic measurement made with a hearing aid in or on a user's ear, such as a microphone signal recorded in response to a stimulus sequence in the context of the FBC-initialization process, can be used by a pre-trained predictive machine-learning algorithm (such as using linear regression) to estimate an outward transfer function of the device in the ear. The resulting estimated vent-out transfer function (a one-dimensional array of real numbers, or vector) can then be compared mathematically to each entry in a stored dictionary or database, where each entry corresponds to a reference vector. In this example, the reference vectors are each representative of a particular combination of form factor and acoustic coupling (e.g., small-vent ITC, open-dome RIC). For example, the vectors may correspond to the arithmetic averages of individual vent-out transfer functions measured in a representative sample of ears. The comparison process can take the form of a distance calculation (for example, mean-squared difference) between the current input vector and the reference vector.

The resulting distance estimates may be used directly, to rank the reference vectors with respect to their dissimilarity with the current estimated vector, and/or to select one of the reference vectors which provides the closest match to the current vector. Importantly and advantageously, the present subject matter combines the distance estimates with additional information prior to making a final selection decision. For example, the distance between each reference vector and the current input vector can be combined linearly (e.g., added) or non-linearly (squared then added, or added then squared) to the distance between each reference vector and one of the reference vectors, selected based on some additional information, such as information provided by the user of the device, or a professional, indicating what type of physical acoustic option is currently used in the user's ear. In various examples, when certain statistical distribution assumptions are met (e.g., Gaussian-distributed measurements), a selection decision based on a weighted sum of squared differences between vectors with appropriately chosen weights may be used, such as a Bayes-optimal decision rule. Even if the selected decision rule is sub-optimal, it may still perform demonstrably better than a decision rule based solely on the current input vector, such as when statistical uncertainty (such as measurement noise) is larger for the current input vector than for the reference vectors, which may be the case when the former is based on an individual measurement and the latter is based on multiple measurements.

In various examples, performance of the system can be further improved by combining information (specifically, the previously computed distances) across the left and right ears of the user, or the left and right sides of a binaural fitting with audio devices. For instance, instead of selecting the reference vector with the smallest combined distance (computed as described above), the algorithm can first add together the combined distances across the left and right devices of a user for each reference vector, and then select the reference vector associated with the smallest across-ear combined distance. In cases of binaural symmetric fittings, or fittings with identical combinations of form-factors and acoustic coupling options on the left and right sides, the decision rule can result in more robust and stable recommendations and reduced variance of performance, and thus improved overall algorithm performance. In addition, this decision rule can lead to lower average errors of prediction of acoustic coupling characteristics, and therefore improved audio device performance overall. The present subject matter provides a mathematical formulation which allows for targeting a pre-defined bias-variance tradeoff or stability criterion by adjusting coefficients (or weights) in a linear combination of easily computed quantities, such as mean squared differences between one-dimension vectors of real ear measurements.

Because individual ear measures of acoustic coupling characteristics obtained using ear-worn audio devices can occasionally be unreliable, the present subject matter combines these individual measures with reference data obtained from a larger sample of ears and/or across the left and right ears of a user to yield demonstrably superior results with respect to relevant acoustic, psychoacoustic, and/or audiological performance criteria. In particular, the present subject matter provides more robust and stable individualized settings of audio device parameters (a highly desirable operational characteristics for hearing aid fitting software), and provides a reduced risk of large deviations (or errors) between target and actual real-ear responses with the device. In one example, the output of the present subject matter may be used in a vent-correction recommender for a hearing device system.

In various examples, the present subject matter includes an algorithm configured to execute inside hearing aid fitting software, and may be initiated by a clinician during a fitting session. In various other examples, the present subject matter includes a firmware algorithm configured to execute on a processor of an ear-worn audio device (e.g., hearing aid). In other examples, the present subject matter provides an algorithm configured to execute on cloud, and uses reference data aggregated across multiple users to supplement the database of reference data. In other examples, the present subject matter provides an algorithm configured to execute on a device of a user (such as an application or app on a mobile phone or other device in communication with the hearing aid), and the user may initiate execution of the algorithm manually or automatically on a programmable interval. In some examples, the app may provide an interface for the user to provide feedback on a satisfaction level with the current device settings, and may use the feedback to provide a recommendation or an automatic adjustment to device parameters. For example, the app may periodically interrogate the user regarding current device settings and performance.

FIG. 1 illustrates a block diagram of a system 100 for setting acoustic coupling parameters for hearing devices, according to various examples of the present subject matter. The system 100 may include an external device 110, such as a personal computer or smartphone, and a hearing device 120. Other types of external devices may be used without departing from the scope of the present subject matter. The hearing device 120 may include an above-ear portion 130 and an in-ear portion 140 which may include a vent 180. In an example, the above-ear portion 130 may include an acoustic input transducer (e.g., microphone 135) for converting received acoustic audio into digital or analog audio signals.

In various embodiments, hearing device 120 is configured to produce a receiver signal (such as a sound signal) through a receiver 190 of the hearing device 120, or a physical extension of the receiver (such as a sound tube of a behind-the-ear device) placed inside an ear canal of a user. The system 100 further includes one or more processors programmed to receive a microphone signal, in response to the receiver signal, from the microphone 135 placed outside the ear canal. In various embodiments, the one or more processors may be in the hearing device 120, in the external device 110, or a combination of both the hearing device 120 and the external device 110. The one or more processors are further programmed to compute an estimate of an acoustic coupling characteristic of the hearing device based on the receiver signal and the microphone signal. The one or more processors may be further programmed to compare the estimate of the acoustic coupling characteristic to stored reference data from a memory to obtain an improved estimate of the acoustic coupling characteristic. The one or more processors may be further programmed to compare the estimate of the acoustic coupling characteristic to a second estimate of the acoustic coupling characteristic computed for a second hearing device placed inside a second ear canal of the user to obtain the improved estimate of the acoustic coupling characteristic. The one or more processors are further programmed to use the improved estimate of the acoustic coupling characteristic to modify an operational characteristic of the hearing device 120, or to make a recommendation for a modification of a physical characteristic or operational characteristic of the hearing device 120.

The hearing device 120 may communicate wirelessly 170 with the external device 110, or using a wired connection, to transmit data or audio for set up and programming the hearing device 120, in some embodiments. In some embodiments a wireless, non-acoustic audio stream may be transmitted from a wireless audio source to the hearing assistance device 120, which may be amplified and provided to a user as an acoustic output 150. A portion of the acoustic output 150 may be fed back to the microphone on the above-ear portion 130, such as via the example acoustic feedback path 160.

Figure 2:
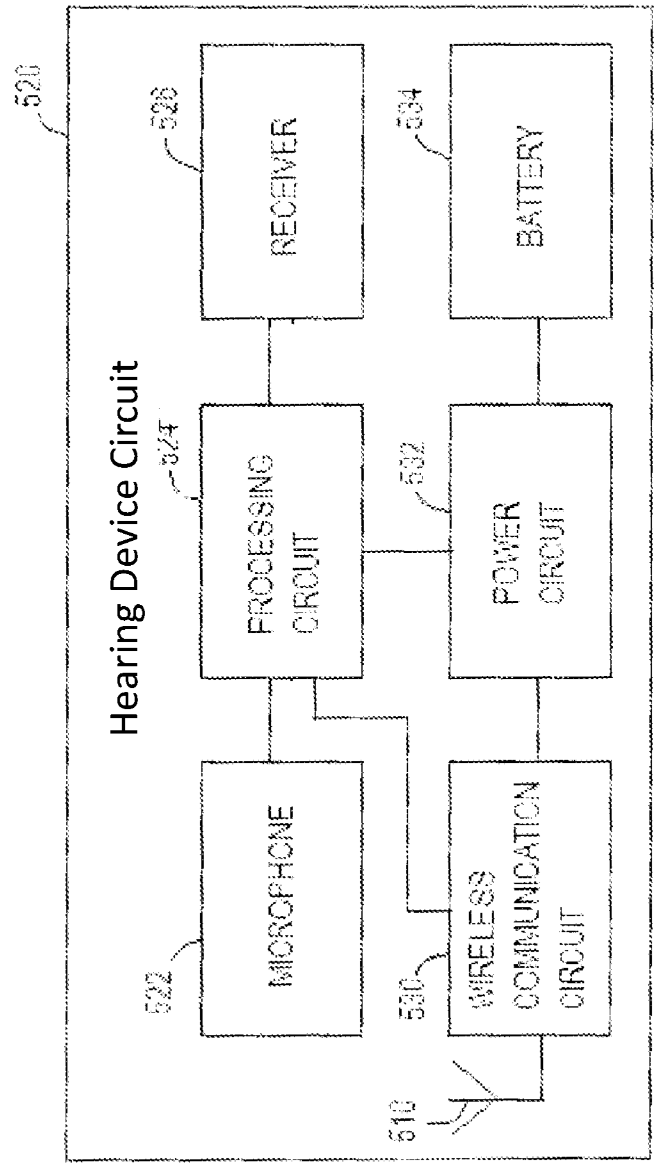
FIG. 2 illustrates a block diagram of a hearing device circuit, according to various examples of the present subject matter.

FIG. 2 illustrates a block diagram of a hearing device circuit, according to various embodiments of the present subject matter. Hearing device circuit 520 represents an example of portions of a hearing device 120 and includes a microphone 522, a wireless communication circuit 530, an antenna 510, a processing circuit 524, a receiver (speaker) 526, a battery 534, and a power circuit 532. Microphone 522 receives sounds from the environment of the hearing device user (wearer of the hearing device). Wireless communication circuit 530 communicates with another device wirelessly using antenna 510, including receiving programming codes, streamed audio signals, and/or other audio signals and transmitting programming codes, audio signals, and/or other signals. Examples of the other device includes other hearing devices of other users, another hearing device of a pair of hearing devices for the same wearer, a hearing device host device, an ALD, an audio streaming device, a smartphone, and other devices capable of communicating with hearing devices wirelessly. Processing circuit 524 controls the operation of hearing device 120 using the programming codes and processes the sounds received by microphone 522 and/or the audio signals received by wireless communication circuit 530 to produce output sounds. Processing circuit 524 may include a memory for instructions or other storage, in various examples. Receiver 526 transmits output sounds to an ear canal of the hearing device wearer. Battery 534 and power circuit 532 constitute the power source for the operation of hearing device circuit 520. In various embodiments, power circuit 532 can include a power management circuit. In various embodiments, battery 534 can include a rechargeable battery, and power circuit 532 can include a recharging circuit for recharging the rechargeable battery.

Figure 3A:
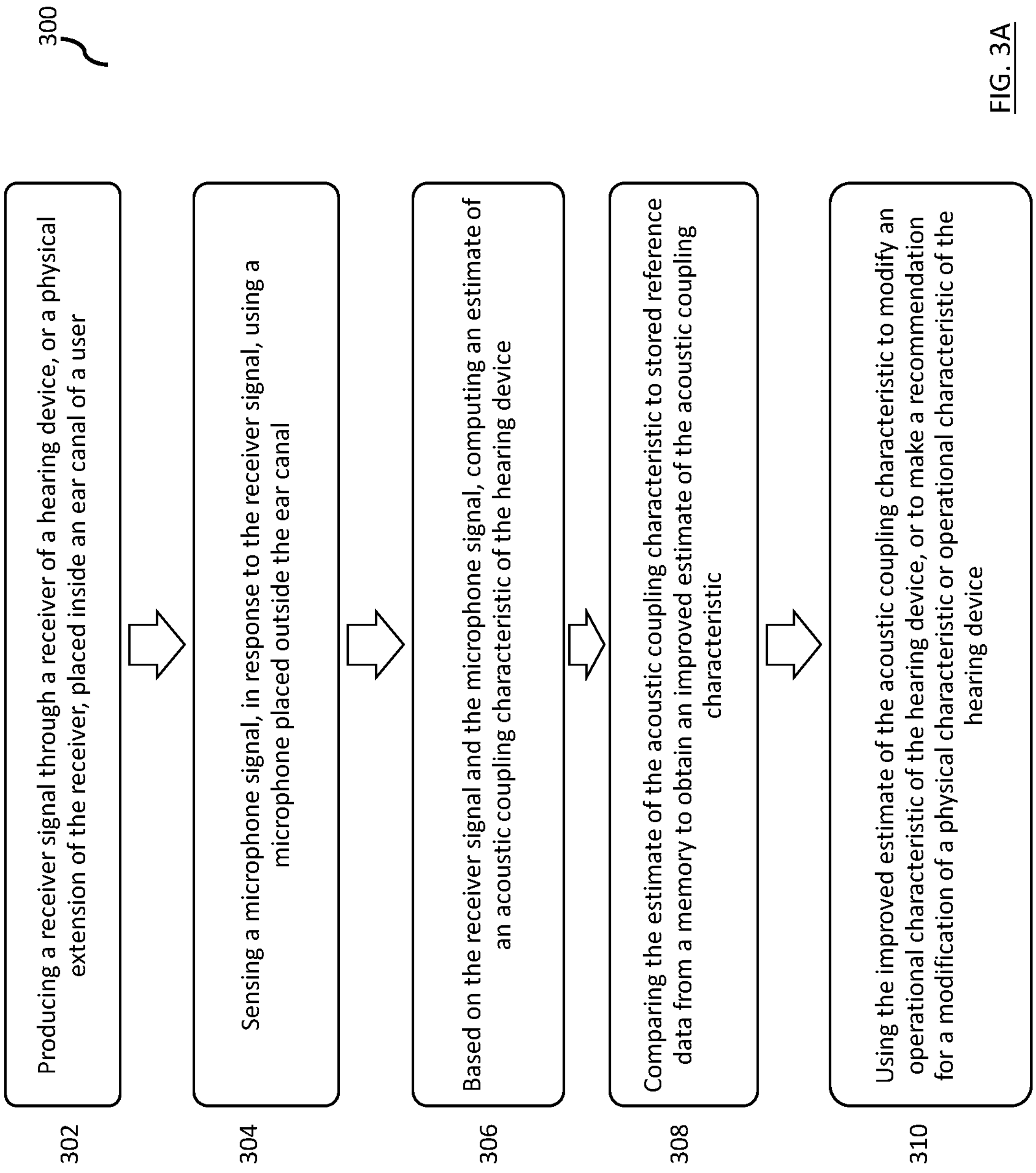
FIG. 3A illustrates a flow diagram of a method for setting acoustic coupling parameters for hearing devices, according to various examples of the present subject matter.

FIG. 3A illustrates a flow diagram of a method for setting acoustic coupling parameters for hearing devices, according to various examples of the present subject matter. The method 300 includes producing a receiver signal through a receiver of a hearing device, or a physical extension of the receiver, placed inside an ear canal of a user, at step 302. A microphone signal is sensed, in response to the receiver signal, using a microphone placed outside the ear canal, at step 304. Based on the receiver signal and the microphone signal, an estimate of an acoustic coupling characteristic of the hearing device is computed, at step 306. The estimate of the acoustic coupling characteristic is compared to stored reference data from a memory to obtain an improved estimate of the acoustic coupling characteristic, at step 308. The improved estimate of the acoustic coupling characteristic is used to modify an operational characteristic of the hearing device, or to make a recommendation for a modification of a physical characteristic or operational characteristic of the hearing device, at step 310.

The estimate of the acoustic coupling characteristic may be compared to a second estimate of the acoustic coupling characteristic computed for a second hearing device placed inside a second ear canal of the user to obtain the improved estimate of the acoustic coupling characteristic, in some examples. In some examples, using the improved estimate of the acoustic coupling characteristic to modify an operation characteristic of the hearing device includes using the improved estimate of the acoustic coupling characteristic to automatically modify gain of the hearing device. Making a recommendation for a modification of a physical characteristic of the hearing device includes making a recommendation to change earbud size, in some examples. In some examples, making a recommendation for a modification of a physical characteristic of the hearing device includes making a recommendation to increase vent size. Making a recommendation for a modification of a physical characteristic of the hearing device includes making a recommendation to decrease vent size, in some examples. In some examples, making a recommendation for a modification of an operational characteristic of the hearing device includes making a recommendation to increase gain of the hearing device. Making a recommendation for a modification of an operational characteristic of the hearing device includes making a recommendation to decrease gain of the hearing device, in some examples. In some examples, the method 300 further includes recording the sensed microphone signal in the memory. The memory is at least partially included with the hearing device, in some examples. In some examples, the memory is at least partially included in a remote device in communication with the hearing device.

Figure 3B:
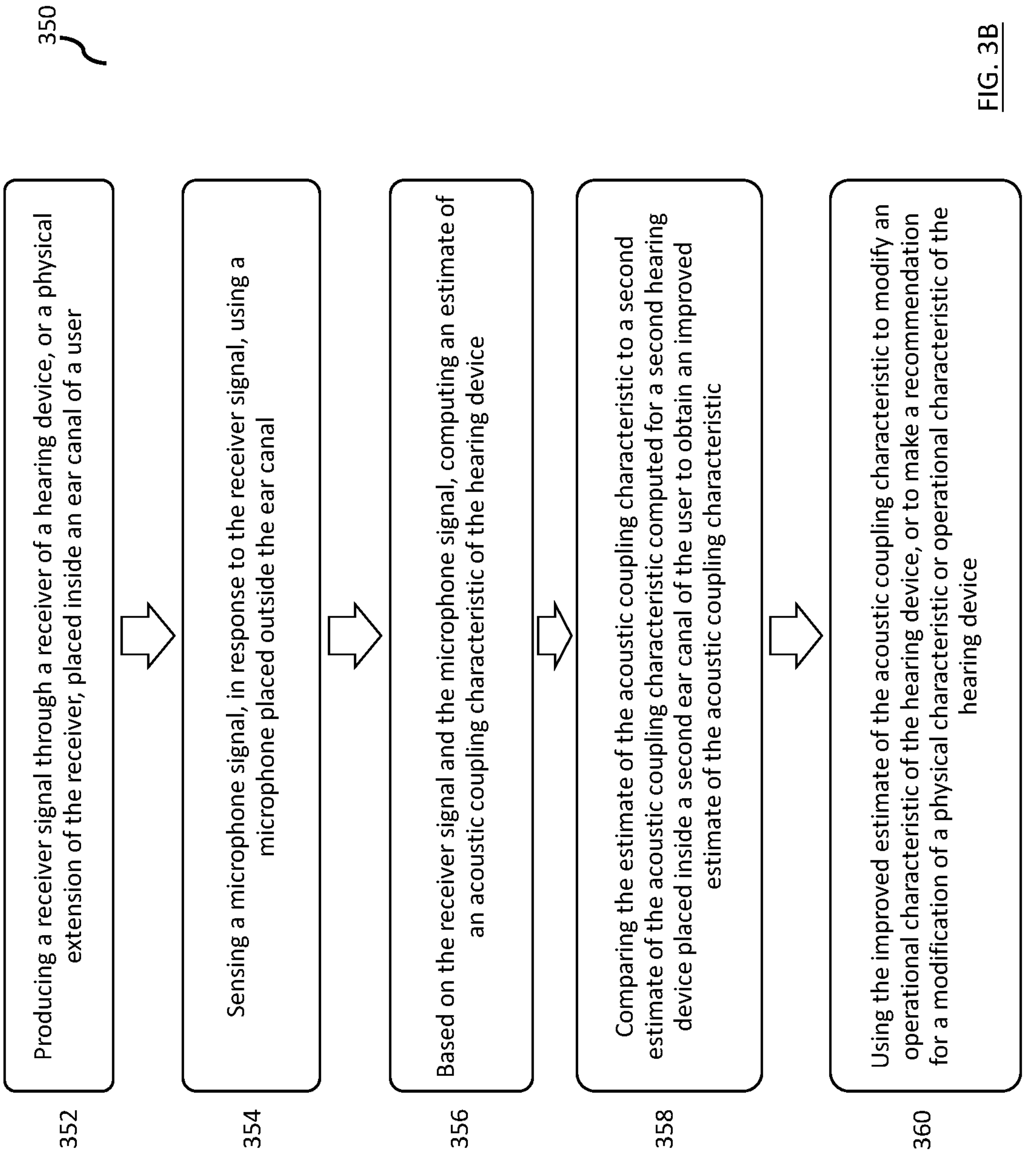
FIG. 3B illustrates a flow diagram of a method for setting acoustic coupling parameters for hearing device applications, according to various examples of the present subject matter.

FIG. 3B illustrates a flow diagram of a method for setting acoustic coupling parameters for hearing device applications, according to various examples of the present subject matter. The method 350 includes producing a receiver signal through a receiver of a hearing device, or a physical extension of the receiver, placed inside an ear canal of a user, at step 352. A microphone signal is sensed, in response to the receiver signal, using a microphone placed outside the ear canal, at step 354. Based on the receiver signal and the microphone signal, an estimate of an acoustic coupling characteristic of the hearing device is computed, at step 356. The estimate of the acoustic coupling characteristic is compared to a second estimate of the acoustic coupling characteristic computed for a second hearing device placed inside a second ear canal of the user to obtain the improved estimate of the acoustic coupling characteristic, at step 358. The improved estimate of the acoustic coupling characteristic is used to modify an operational characteristic of the hearing device, or to make a recommendation for a modification of a physical characteristic or operational characteristic of the hearing device, at step 360. The estimate of the acoustic coupling characteristic may be compared to stored reference data from a memory to obtain the improved estimate of the acoustic coupling characteristic, in some examples.

In various examples, the present subject matter includes a method (e.g., a multi-step algorithm) for combining acoustic coupling measures or estimates across the left and right ears and/or with reference data, to optimize desirable performance metrics of audio device settings made using the method. Thus, the present subject matter can stabilize behavior of the recommender algorithm, making it more user-friendly and less confusing to hearing care professionals using fitting software and improving system performance resulting in a more robust audio fitting feature.

In various examples, if a symmetric fitting across left and right ears of a user is targeted, the present system may compare acoustic characteristics to the opposite ear device, or to both the opposite ear device and a reference database. If acoustic characteristics of both ear devices are consistent, the present subject matter provides increased confidence in the sensed (or computed) acoustic characteristic. In some examples, if an asymmetric fitting across left and right ears of a user is targeted, the present system may compare acoustic characteristics only to a reference database. In various examples, comparing acoustic characteristics to those of similar users with similar devices (and/or prior data from the same user) in a database can assist in correcting unreliability in measurement and computation of acoustic characteristics. Other combinations of comparisons are possible without departing from the scope of the present subject matter.

The present subject matter may provide input to a vent correction recommender (VCR), in some examples. In various examples, if the present algorithm detects a discrepancy, a signal can be provided to the user that a mismatch has been detected, and the user can have an option of applying parameter update or other recommended action based on the computed acoustic characteristic. In some examples, if the user has enabled automatic parameter changes, the parameter of the device may be automatically updated based on the acoustic characteristic. In various examples, the present subject matter may detect acoustic leakage if a device is not very occluding, and later detects that the device is occluding, and then provide a parameter change or recommendation based on the detected change.

In various embodiments, the present subject matter estimates eardrum sound pressure (or vent effects) of a hearing aid or hearing device user based on acoustic measurements of the feedback path. In various embodiments, an algorithm is provided that can be implemented inside a hearing aid (in firmware or software) and/or in an external device, such as a personal computer or smartphone (in hearing aid fitting software). The algorithm uses maximum stable gain (MSG) estimates derived from an initialization process of a feedback-canceller (FBC) system on the hearing device inside the patient's ear, in various embodiments.

Eardrum sound-pressure and/or vent-effect estimates obtained using the present subject matter can be used, after comparison or combination with reference data and/or other ear data, to automatically adjust parameters of the user's hearing aid, including but not limited to: amplification gains, low-frequency amplification applied to audio signals streamed into the hearing aid from another audio device, acoustic stimulus level for in-situ audiometry, or tinnitus-stimulus for acoustic therapy for tinnitus. Such automated adjustment of gains based on estimates of individual eardrum sound pressure can provide various benefits during the hearing aid fitting process, including but not limited to: automated individualized adjustments of hearing aid gains, and automated adjustment of stimulus levels during in-situ audiometry. In addition, the automated adjustments can be advantageous subsequent to the fitting process, by providing improved audio sound quality, improved loudness comfort, improved speech understanding, and improved tinnitus-masker efficacy/efficiency. Further, the present subject matter may be combined with a perceptual hearing threshold measurement.

As provided herein, a vent effect is the difference in sound pressure inside the ear canal, with the device in place, relative to some reference condition (e.g., completely occluded ear canal or completely open ear canal). The term 'vent' should not be interpreted to mean solely a vent in the traditional sense of an opening in a custom hearing aid, but rather any acoustic opening or leakage, such as might occur, for instance, in a receiver-in-canal (RIC) hearing aid equipped with a stock earbud.

Maximum stable gains (MSGs), also referred to as "added stable gains" (ASGs) or "gain margins", designate the highest sound amplification gains that can be achieved by a hearing device positioned in the ear canal, without triggering a significant acoustic feedback signal resulting from an electro-acoustic loop between the receiver or body of the device and one of the microphones on the device, that cannot be effectively suppressed by the feedback canceller (FBC) system. MSGs are usually measured after the device is inserted into the ear canal for the first time by a professional hearing care provider or by the user himself, during a process commonly referred to as "FBC initialization". This FBC initialization process is usually performed at least once prior to the initial adjustment (usually, performed by a hearing care professional) of certain hearing aid parameters, such as, in particular, the gains for sound amplification delivered by the device into the user's ear. In addition, MSGs can be measured or estimated at other times. For example, MSGs can be measured or estimated periodically after the initial fitting, either just after the user puts the hearing aid or audio device into his ear or while the devices are being used and running the FBC (e.g., the adaptive filter used in the feedback cancellation algorithm).

Various embodiments of the present subject matter include a method for computing a 'reliability' signal (e.g., signal-to-noise ratio) of the microphone signal, based on the receiver and microphone signals, computing a feedback-path signal, computing a signal corresponding to a spectral representation (e.g., Fourier transform) of the feedback-path signal, using a mathematical combination of the spectral-representation signal and the reliability signal to compute a real-ear response signal and/or a vent-effect estimate, comparing (or combining) the computed real-ear response signal or vent-effect estimate (or acoustic characteristic) to reference data and/or other ear data, and using the combined data to automatically modify an operational characteristics of the hearing device and/or make a recommendation to the user or to a clinician for a modification of physical (e.g., change earbud, increase/decrease vent) or operational characteristics (e.g., gains) of the hearing device.

In various embodiments, the method may be combined with measurement of the user's hearing threshold at, at least one frequency, where the threshold is measured in response to sounds played through the hearing device receiver. In some embodiments, the method may further include a perceptual preference test (e.g., paired comparison) wherein the device user is presented with stimuli processed through the adjusted hearing aid parameters (based on the REAR estimate), plus possibly some comparison stimulus (e.g., unadjusted), and asked to indicate a preference. The results of this preference test may then be used to verify, or further improve, the adjustment. The present subject matter may be implemented in software, such as in the fitting software of a hearing aid or audio device running on a personal computer or any other electronic medium equipped with a processor (smartphone, tablet, or other device), or on a processor of the hearing aid or audio device itself.

According to various embodiments, the feedback path measurement occurs during the initial fitting of the device, which can be performed either by a clinician, or by the user in case of device sold direct to consumer. According to various embodiments, FBC data collection (feedback path and MSG estimation) occurs post initial fitting, during run-time operation of the hearing aid on the user's ear. In various embodiments, FBC initialization is performed to estimate MSGs.

The reliability signal can be used advantageously to determine automatically whether the feedback path signal is sufficiently accurate to support reliable estimation of a real-ear response or vent effect, and to determine automatically which parts (e.g., frequencies or frequency bands) of the feedback-path signal are accurate (high signal-to-noise ratio) and can be used to reliably estimate the real-ear response or the vent-effect, which is a form of 'automatic relevance determination' (ARD). The reliability signal can be used as the acoustic coupling characteristic or to compute the acoustic coupling characteristic, in some examples. The present subject matter may also be integrated into an earbud-recommender system, which includes a warning system that warns the clinician when the measured/estimated vent effect in a user's ear does not match the current model assumptions in the fitting software.

Figure 4:
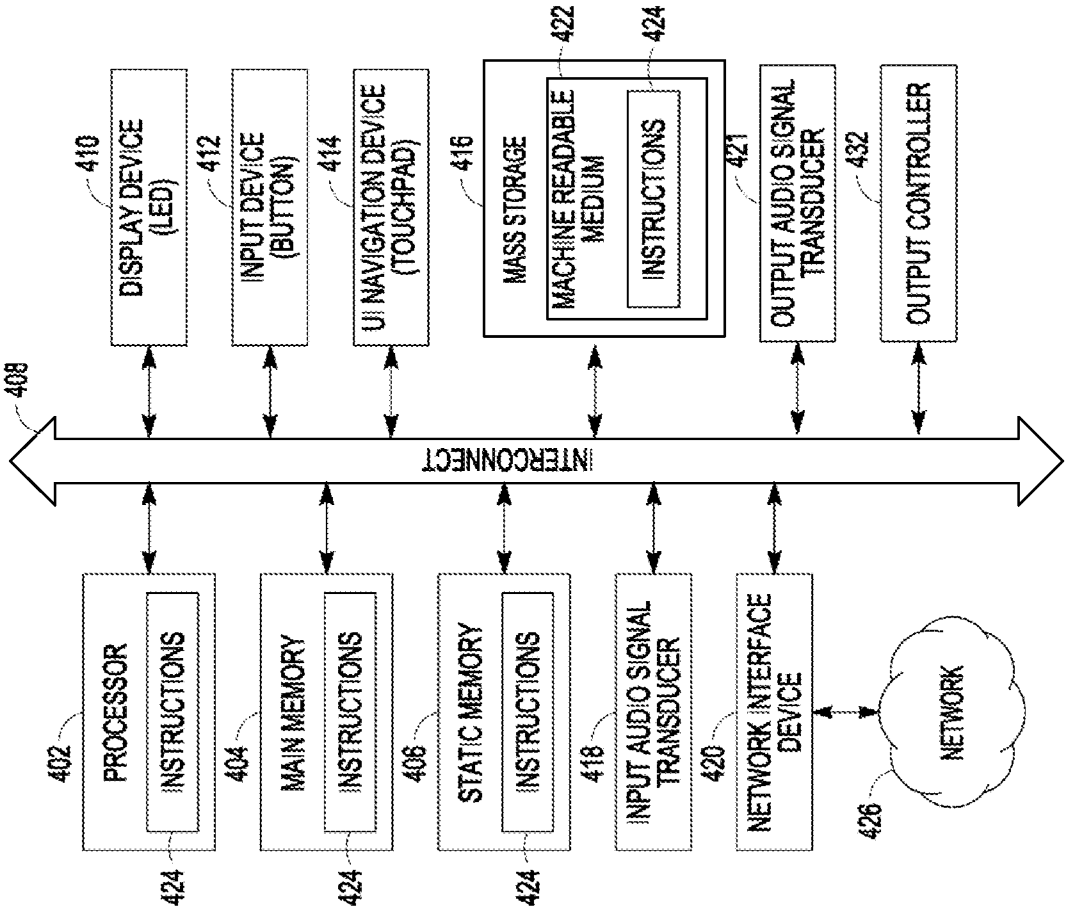
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various embodiments of the present subject matter support wireless communications with a hearing device. In various embodiments the wireless communications may include standard or nonstandard communications. Some examples of standard wireless communications include link protocols including, but not limited to, Bluetooth™, Bluetooth™ Low Energy (BLE), IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction hearing devices, in some embodiments. The present subject matter may be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising:

producing a receiver signal through a receiver of a hearing device, or a physical extension of the receiver, placed inside an ear canal of a user;

sensing a microphone signal, in response to the receiver signal, using a microphone placed outside the ear canal;

based on the receiver signal and the microphone signal, computing an estimate of an acoustic coupling characteristic of the hearing device;

programmatically combining the computed estimate of the acoustic coupling characteristic with stored reference data from a memory to obtain an improved estimate of the acoustic coupling characteristic by enhancing statistical reliability or robustness of the computed estimate of the acoustic coupling characteristic using the stored reference data; and modifying an operational characteristic of the hearing device, or making a recommendation for a modification of a physical characteristic or operational characteristic of the hearing device, using the improved estimate of the acoustic coupling characteristic.

2. The method of claim 1, further comprising:

combining the estimate of the acoustic coupling characteristic with a second estimate of the acoustic coupling characteristic computed for a second hearing device having a second receiver, or a physical extension of the second receiver, placed inside a second ear canal of the user to obtain the improved estimate of the acoustic coupling characteristic by further enhancing the statistical reliability or robustness of the computed estimate of the acoustic coupling characteristic using the second estimate of the acoustic coupling characteristic.

3. The method of claim 1, wherein using the improved estimate of the acoustic coupling characteristic to modify an operation characteristic of the hearing device includes using the improved estimate of the acoustic coupling characteristic to automatically modify gain of the hearing device.

4. The method of claim 1, wherein making a recommendation for a modification of a physical characteristic of the hearing device includes making a recommendation to change earbud size.

5. The method of claim 1, wherein making a recommendation for a modification of a physical characteristic of the hearing device includes making a recommendation to increase vent size.

6. The method of claim 1, wherein making a recommendation for a modification of a physical characteristic of the hearing device includes making a recommendation to decrease vent size.

7. The method of claim 1, wherein making a recommendation for a modification of an operational characteristic of the hearing device includes making a recommendation to increase gain of the hearing device.

8. The method of claim 1, wherein making a recommendation for a modification of an operational characteristic of the hearing device includes making a recommendation to decrease gain of the hearing device.

9. The method of claim 1, further comprising:

recording the sensed microphone signal in the memory.

10. The method of claim 9, wherein the memory is at least partially included with the hearing device.

11. A method, comprising:

producing a receiver signal through a receiver of a hearing device, or a physical extension of the receiver, placed inside an ear canal of a user;

sensing a microphone signal, in response to the receiver signal, using a microphone placed outside the ear canal;

based on the receiver signal and the microphone signal, computing an estimate of an acoustic coupling characteristic of the hearing device;

programmatically combining the computed estimate of the acoustic coupling characteristic with a second estimate of the acoustic coupling characteristic computed for a second hearing device having a second receiver, or a physical extension of the second receiver, placed inside a second ear canal of the user to obtain an improved estimate of the acoustic coupling characteristic by enhancing statistical reliability or robustness of the computed estimate of the acoustic coupling characteristic using the second estimate of the acoustic coupling characteristic; and modifying an operational characteristic of the hearing device, or making a recommendation for a modification of a physical characteristic or operational characteristic of the hearing device, using the improved estimate of the acoustic coupling characteristic.

12. The method of claim 11, further comprising:

combining the computed estimate of the acoustic coupling characteristic with stored reference data from a memory to obtain the improved estimate of the acoustic coupling characteristic by further enhancing the statistical reliability or robustness of the computed estimate of the acoustic coupling characteristic using the stored reference data.

13. The method of claim 11, wherein using the improved estimate of the acoustic coupling characteristic to modify an operation characteristic of the hearing device includes using the improved estimate of the acoustic coupling characteristic to automatically modify gain of the hearing device.

14. The method of claim 11, wherein making a recommendation for a modification of a physical characteristic of the hearing device includes making a recommendation to change earbud size.

15. The method of claim 11, wherein making a recommendation for a modification of a physical characteristic of the hearing device includes making a recommendation to increase vent size.

16. The method of claim 11, wherein making a recommendation for a modification of a physical characteristic of the hearing device includes making a recommendation to decrease vent size.

17. The method of claim 11, wherein making a recommendation for a modification of an operational characteristic of the hearing device includes making a recommendation to increase gain of the hearing device.

18. The method of claim 11, wherein making a recommendation for a modification of an operational characteristic of the hearing device includes making a recommendation to decrease gain of the hearing device.

19. The method of claim 12, further comprising: recording the sensed microphone signal in the memory.

20. The method of claim 19, wherein the memory is at least partially included in a remote device in communication with the hearing device.

* * * * *